US010023785B2

(12) United States Patent
Barclay

(10) Patent No.: US 10,023,785 B2
(45) Date of Patent: Jul. 17, 2018

(54) THIXOTROPIC AGENTS AND METHODS OF USE

(75) Inventor: David A. Barclay, Lake Charles, LA (US)

(73) Assignee: Sasol Performance Chemicals GmbH, Hamburg (DE)

( * ) Notice: Subject to any disclaimer, the term of this patent is extended or adjusted under 35 U.S.C. 154(b) by 221 days.

(21) Appl. No.: 14/370,629

(22) PCT Filed: Aug. 22, 2012

(86) PCT No.: PCT/US2012/051819
§ 371 (c)(1),
(2), (4) Date: Jul. 18, 2014

(87) PCT Pub. No.: WO2013/115845
PCT Pub. Date: Aug. 8, 2013

(65) Prior Publication Data
US 2015/0021033 A1    Jan. 22, 2015

Related U.S. Application Data

(60) Provisional application No. 61/592,869, filed on Jan. 31, 2012.

(51) Int. Cl.
C09K 8/62    (2006.01)
C09K 8/80    (2006.01)
E21B 43/26   (2006.01)
C09K 8/68    (2006.01)
C09K 8/03    (2006.01)
C09K 8/88    (2006.01)
C09K 8/90    (2006.01)

(52) U.S. Cl.
CPC .................. C09K 8/62 (2013.01); C09K 8/03 (2013.01); C09K 8/685 (2013.01); C09K 8/80 (2013.01); C09K 8/887 (2013.01); C09K 8/90 (2013.01); E21B 43/26 (2013.01); C09K 2208/10 (2013.01)

(58) Field of Classification Search
None
See application file for complete search history.

(56) References Cited

U.S. PATENT DOCUMENTS 5,531,976 A * 7/1996 Decker, Jr. .............. B01J 13/00
                                                    423/625
2008/0096047 A1* 4/2008 Yamane ................ A23L 3/3436
                                                    428/702

* cited by examiner

Primary Examiner — Jeffrey Washville
(74) Attorney, Agent, or Firm — Bushman Werner, P.C.

(57) ABSTRACT

A thixotropic agent comprised of a gel which is comprised of a polymeric organic material cross-linked with certain boehmite aluminas having a crystallite size of less than about 100 Å as measured on the 120 plane.

7 Claims, 5 Drawing Sheets

○  INCREASING STRESS 1% GUAR + 30% BORIC ACID
□  DECREASING STRESS 1% GUAR + 30% BORIC ACID
△  INCREASING STRESS 0.25% GUAR + 0.25% 23N4
▲  DECREASING STRESS 0.25% GUAR + 0.25% 23N4
×  INCREASING STRESS 0.25% GUAR + 1% 23N4
●  DECREASING STRESS 0.25% GUAR + 1% 23N4
⊕  INCREASING STRESS 0.25% GUAR + 2% 23N4
○  DECREASING STRESS 0.25% GUAR + 2% 23N4

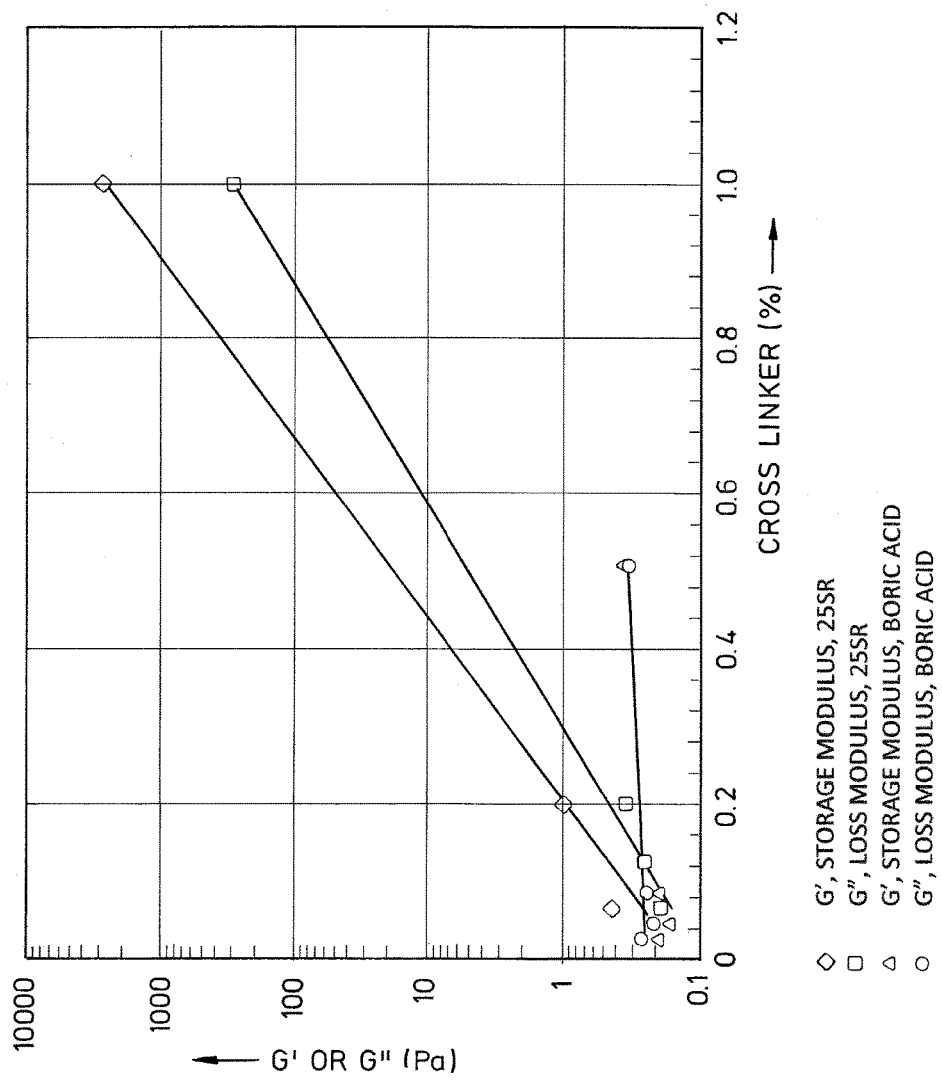

THIXOTROPIC AGENTS AND METHODS OF USE

CROSS REFERENCE TO RELATED APPLICATION

This application is a national phase application of PCT/US2012/051819, filed Aug. 22, 2012, which claims priority to U.S. Application No. 61/592,869 filed on Jan. 31, 2012 the disclosures of which are incorporated herein by reference for all purposes.

FIELD OF THE INVENTION

The present invention relates to thixotropic agents for use in a wide variety of applications, e.g., in fracturing fluids used in the oil and gas industry, and to methods of using such thixotropic agents.

BACKGROUND OF THE INVENTION

Thixotropic agents find usage in a wide variety of applications stretching from food preparation to use in downhole fluids used in the drilling, completing and production of oil and gas wells. In particular, and with respect to the oil and gas industry, hydraulic fracturing of downhole formations for enhanced recovery techniques is rising dramatically. As is well known, in the United States there are numerous shale formations containing trillions of cubic feet of natural gas and billions of barrels of oil. The problem with these shale formations is that the oil and/or gas is tightly held because of the generally small pore size of the shale. Accordingly, unlike in other formations, the oil and gas is not readily released from the formation for production. To overcome this difficulty, operators have resorted to hydraulic fracturing or "fracking."

In fracking, the fluid, e.g., a liquid, gas or two-phase fluid, is injected into a downhole formation at sufficient pressure and flow rate to fracture the subterranean formation. Typically, a proppant material such as sand, fine gravel, sintered bauxite, glass beads or the like can be introduced into the fractures to keep them open, i.e., propped. These propped fractures provide larger flow channels through which an increased quantity of hydrocarbon can flow, thereby increasing the production capability of a well.

It is known to use hydrophilic materials, sometimes referred to as "gelling agents" to increase the viscosity of the liquid fracturing fluids. These high viscosity aqueous fracturing fluids lead to the development of wider fractures to improve productivity further into the formations, increase the proppant carrying capacity of the fracking fluid, and permit better fluid loss control.

Additionally, high viscosity treating fluids are used for carrying out subterranean well completions, for transporting sand in sand and gravel packing procedures and in various other well treating procedures. Further, high viscosity treating fluids have the ability in cleaning applications such as in the cleaning of tubular goods, production equipment and industrial equipment.

Hydrophilic gelling agents such as partially hydrolyzed polyacrylamides, natural gums, modified natural gums, celluloses and xantham polymers have been utilized in the past to increase the viscosity of aqueous media. However, in many cases, the gels produced with these gelling agents have limited stability at elevated temperatures, i.e., the viscosity of the gel in aqueous solution decreases substantially after only a short period of time. On the other hand, chemicals which cross-link complex hydrated gelling agents have also been utilized for further increasing their viscosity, see for example U.S. Pat. Nos. 3,888,312; 4,021,355; 4,033,415; 3,959,003; 3,979,303; 4,413,834; 4,324,668; and 4,579,670.

SUMMARY OF THE INVENTION

In one aspect, the present invention provides a cross-linked thixotropic agent.

In another aspect, the present invention provides a method of using certain, cross-linked thixotropic agents in various applications.

In yet another aspect, the present invention provides an aqueous dispersible, cross-linked thixotropic composition.

In still a further aspect, the present invention provides an aqueous well treatment fluid having a cross-linkable thixotropic agent and a cross-liking agent comprising an alumina compound.

In another aspect, the present invention provides a method of treating a downhole formation with an aqueous fluid containing a cross-linked thixotropic agent.

These and further features and advantages of the present invention will become apparent from the following detailed description.

BRIEF DESCRIPTION OF THE DRAWINGS

FIG. 5 is a graph showing how altering the amount of alumina changes the viscoelastic character of the cross-linked gel.

DETAILED DESCRIPTION OF PREFERRED EMBODIMENTS

Figure 1:
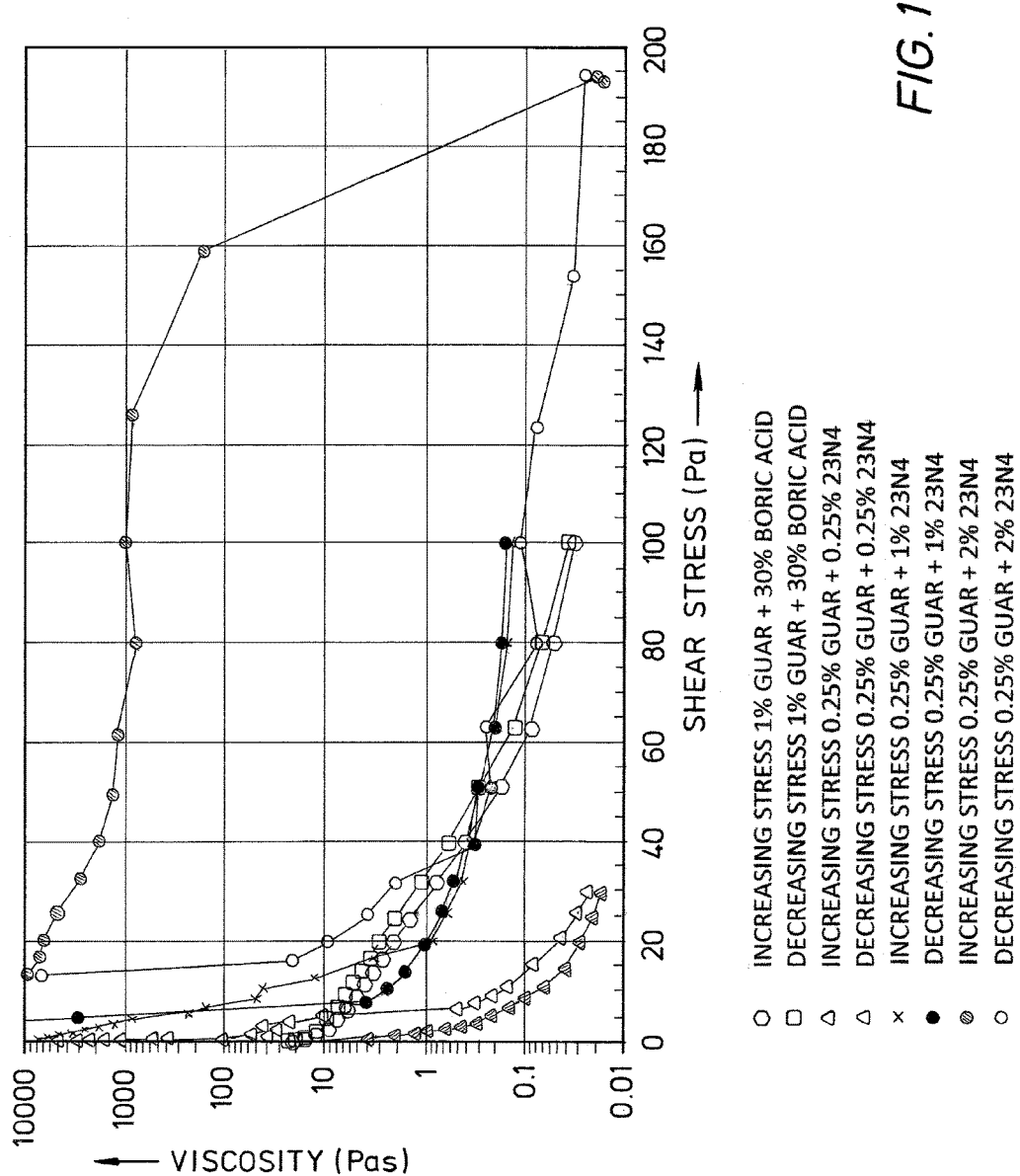
FIG. 1 is a graph showing the relationship between viscosity and shear stress for various guar alumina gels and guar and borate gels at various concentrations.

While the present invention will be described with reference to a polysaccharide, particularly a polysaccharide of the galactomannan type cross-linked or complexed with an alumina compound, it will be understood, as seen hereafter, that the invention is not so limited.

Chemically, guar gum is a polysaccharide composed of the sugars galactose and mannose. The backbone is a linear chain of beta 1,4-linked mannose residues to which galactose residues are 1,6-linked at every second mannose forming short side branches. The structure of guar gum is well known and need not be set forth here. Guar gum can be cross-linked to form a strong gel structure by linking the OH— groups. Typically, this cross-linking has been conducted using borate at least in connection with downhole oil and gas operations. It is also known to cross-link guar gum with titanium complexes and zirconium compounds.

Due to the rapid rise of drilling in the United States, particularly in shale formations containing tightly bound hydrocarbons, the price of guar gum has risen dramatically over the last several years. Further, guar gum is limited in quantity, and the quality of available product has deteriorated.

In connection with producing oil and/or gas from shale formation, a fracturing fluid, as described above, is commonly used. In this regard and with respect to guar gum, one widely used fracturing fluid comprises guar gum dispersed in water to form a viscous fluid followed by the addition of boric acid at a pH of above about 9.5 to release boron/borate from the boric acid. The latter species reacts with the OH— groups on the guar to cross-link and form a strong gel structure. The order of the addition of the base and boric acid can be reversed. The strong gel is generally formed downhole in the completion zone of a well and with the application of pressure, is used to fracture the formation to enhance recovery of oil and gas from the well.

It has now been discovered that alumina, particularly certain boehmite aluminas can be used to cross-link guar gum in water. The alumina cross-linking agent can be used to tune the rheological properties of the guar gel to achieve different and potentially stronger gels as needed, than can be made using the traditional guar gum/borate systems. Accordingly, the present invention can be used to reduce the amount of guar needed to produce a gel structure of comparable rheological properties to that produced in the conventional manner. Additionally, it has been found that using the aluminas of the present invention as a cross-linking agent, cross-linked guar gels can be treated under acidic, neutral and basic pH conditions. This offers flexibility in fracking operations that has not heretofore been available.

As noted, the aluminas suitable in the present invention are preferably boehmite (or pseudo boehmite) aluminas. Particularly preferred are boehmite aluminas having a crystallite size of less than about 100 Å as measured on the 120 plane. The preferred aluminas are dispersible in water in the sense that they can be broken down to crystallites or near fundamental crystallites by action of acid either due to a pretreatment of the alumina or by predispersion with acid in water for a suitable period of time.

NMR analysis of various boehmite aluminas which are useful in the present invention has revealed that the aluminas, which effectively act as cross-linking agents, can be correlated with a specific NMR peak measured for the Al-27 nucleus. The peak occurs at 80 ppm and corresponds to a symmetric, tetrahedral aluminate species which forms during dispersion of certain aluminas that is responsible for the cross-linking activity. It has also been found that as this peak increases in intensity, the alumina is better able to cross-link guar in solution. On the other hand, if the alumina does not display this particular NMR peak, it will not cross-link. The Al-27 NMR peak is related to the active, cross-linking alumina species having a tetrahedral alumina species of the following formulas:

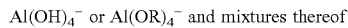

$Al(OH)_4^-$ or $Al(OR)_4^-$ and mixtures thereof wherein R is an organic leaving group that can associate with the alumina in this configuration in the sense that during in the cross-linking process it can disassociate from the alumina crystallites and then react with the hydroxyl groups of the polymer organic material. R can be any organic leaving group which readily dissociates from the Al—O bond making it free to cross-link the polymer. Further analysis of the NMR peak at 80 ppm and in particular integration thereof of various aluminas in dispersion shows that DISPAL 25SR[1], which is a paratoluene sulfonic acid (PTSA) based product, shows as much as fifty times more of the tetrahedral alumina species present in solution as compared with other aluminas. Further, this particular alumina (PTSA) cross-links guar at lower concentrations than some of the other boehmite aluminas.

[1] Boehmite alumina hydrothermally aged in the presence of PTSA and thus spray dried.

Depending on the alumina employed, cross-linking of the guar gum occurs at acidic to near neutral pH without the addition of any base or adjustment to pH. In the presence of nitric acid, certain boehmite aluminas readily cross-link guar gum. In other cases, cross-linking with some boehmite alumina occurs at near neutral to basic pH when a base is added to the guar gum/alumina mixture.

Non-limiting examples of conventionally available aluminas which are useful as cross-linking agents include:

1. Dispal 23N4 alumina[2] sol—This cross-links guar under acidic pH by adding it as a dispersion to the guar dispersion.
[2] Boehmite alumina sol marketed by Sasol North America, Inc. having a crystallite size of 91 Angstroms and a pH of 4.54.

2. Dispal T25N4 alumina sol[3]—This cross-links guar under acidic pH by adding it as a dispersion to the guar dispersion.
[3] Boehmite alumina sol marketed by Sasol North America, Inc. having a crystallite size of 64.3 Angstroms and a pH of 3.5.

3. Dispal 25SR alumina[4] dispersion—This cross-links guar under basic pH by adding it as a water dispersion to dispersed guar then raising the pH using a base.
[4] Boehmite alumina sol marketed by Sasol North America, Inc. having a crystallite size of 54 Angstroms and a pH of 4.0.

4. Catapal A alumina[5] dispersed in 5% nitric acid solution—This cross-links guar under acidic pH by adding it as a dispersion to the guar dispersion.
[5] Boehmite alumina powder marketed by Sasol North America, Inc. having a crystallite size of 38 to 45 Angstroms.

Each of the above and similar alumina products creates a strong gel structure by cross-linking the guar in a water dispersion. As noted, the amount of guar needed to create a rheologically identical gel compared to one that is cross-linked with borate is reduced using the aluminas of the present invention as the cross-linking agent. Further, the properties of the gel can be "tuned" by adding more or less of such aluminas. This is unique compared to the borate system which produces a gel with the same properties regardless of the ratio of borate to guar in the system. This ability to produce a cross-linked guar gel using less guar than conventionally employed with a borate system is extremely important.

In addition, it is possible to reverse the gellation by reversing the pH under which cross-linking occurs. If the alumina cross-links the polymer under acidic conditions, then making the gel basic will cause the gel to revert to a non-cross-linked dispersion. Similarly, if the cross-linking takes place under base conditions, the fluidity can be recovered by making the gel acidic.

Currently, approximately 80% of all production of guar occurs in India. With its use in fracking operations which, as noted, has dramatically increased, the price of guar has risen by orders of magnitude. Accordingly, the ability to reduce the amount of guar needed to produce a rheologically acceptable gel for fracking fluid is of great financial significance.

Generally speaking, a guar gum gel according to the present invention useful in fracturing fluids is produced by mixing from 0.1-2 wt % guar gum in an aqueous medium, cross-linked with from about 0.1-2 wt % of the boehmite aluminas discussed above. In particular it has been found that using Dispal 23N4 sol added at a 1% level to a 1% guar gum aqueous dispersion produces a guar gum gel similar to a typical borate cross-linked gel. Similar amounts of other cross-linkable organic polymers material and alumina may be used to make gelled composition.

Dispal T25N4 sol performs in a similar manner, while a dispersion of Dispal 25SR added at 1% to a guar gum dispersion, after adjusting the pH to basic, produces a gel that is up to ten times stronger than one produced by the conventional borate cross-linking method. The use of alumina in cross-linking guar gum is particularly advantageous in connection with the manufacture of fracking fluids since it reduces the amount of guar needed to produce a comparable strength gel to that produced by the conventional borate cross-linking method. Further, and as noted, the gel properties can be modified by the amount of alumina used and, both acidic and basic gels can be created as compared to borate systems which are only basic pH.

FIG. 1 shows viscosity curves for several guar and alumina gels compared with a borate gelled guars. As can be seen from FIG. 1, the amount of Dispal 23N4 used as a cross-linking agent controls the rheology of the gel. For example, using guar at 0.25 wt % and increasing the Dispal 23N4 amount produces gels that start out less viscous than the borate linked guar at 1% but become more viscous as the alumina is increased. The yield stress of the gel also increases as the alumina content increases.

Figure 3:
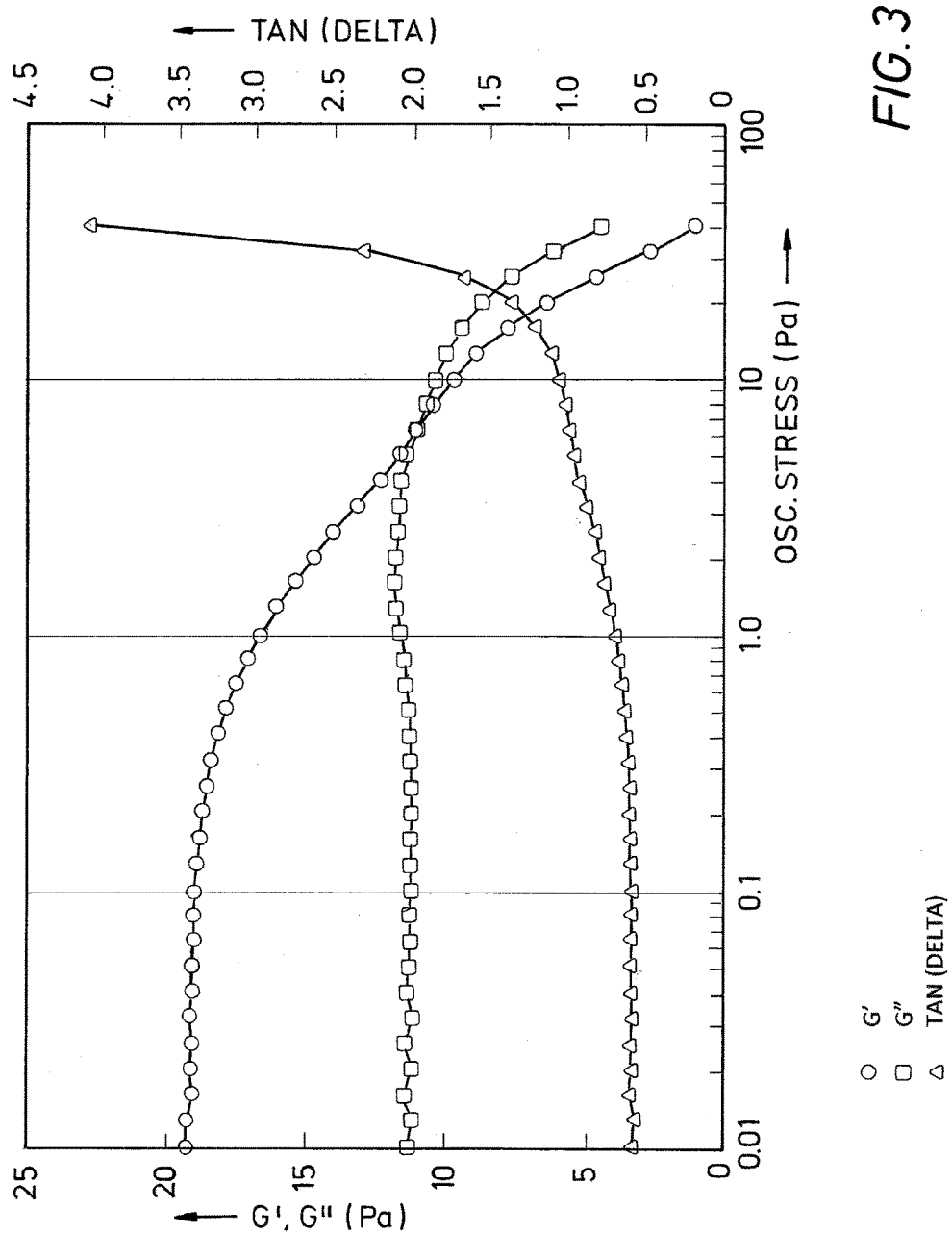
FIG. 3 is an oscillatory stress curve showing that gels produced according to the present invention are viscoelastic.
Figure 4:
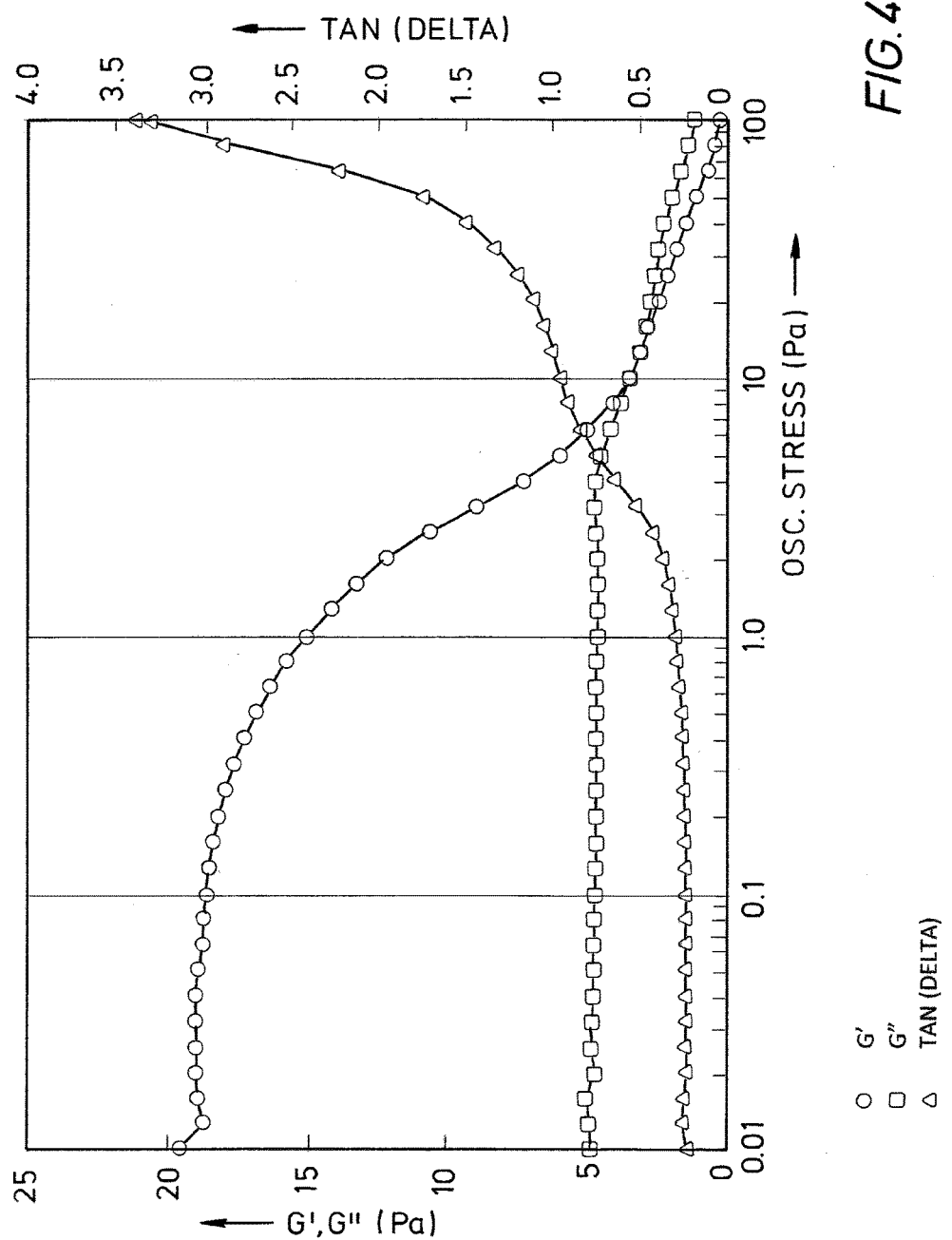
FIG. 4 is a graph similar to FIG. 3.

It has also been found that the gels produced according to the present invention are viscoelastic. In particular, the parameters of a standard borate gel can be matched for both the viscous and elastic components using alumina as a cross-linking agent. This can be seen by reference to the oscillatory stress curves in FIGS. 3 and 4.

Figure 2:
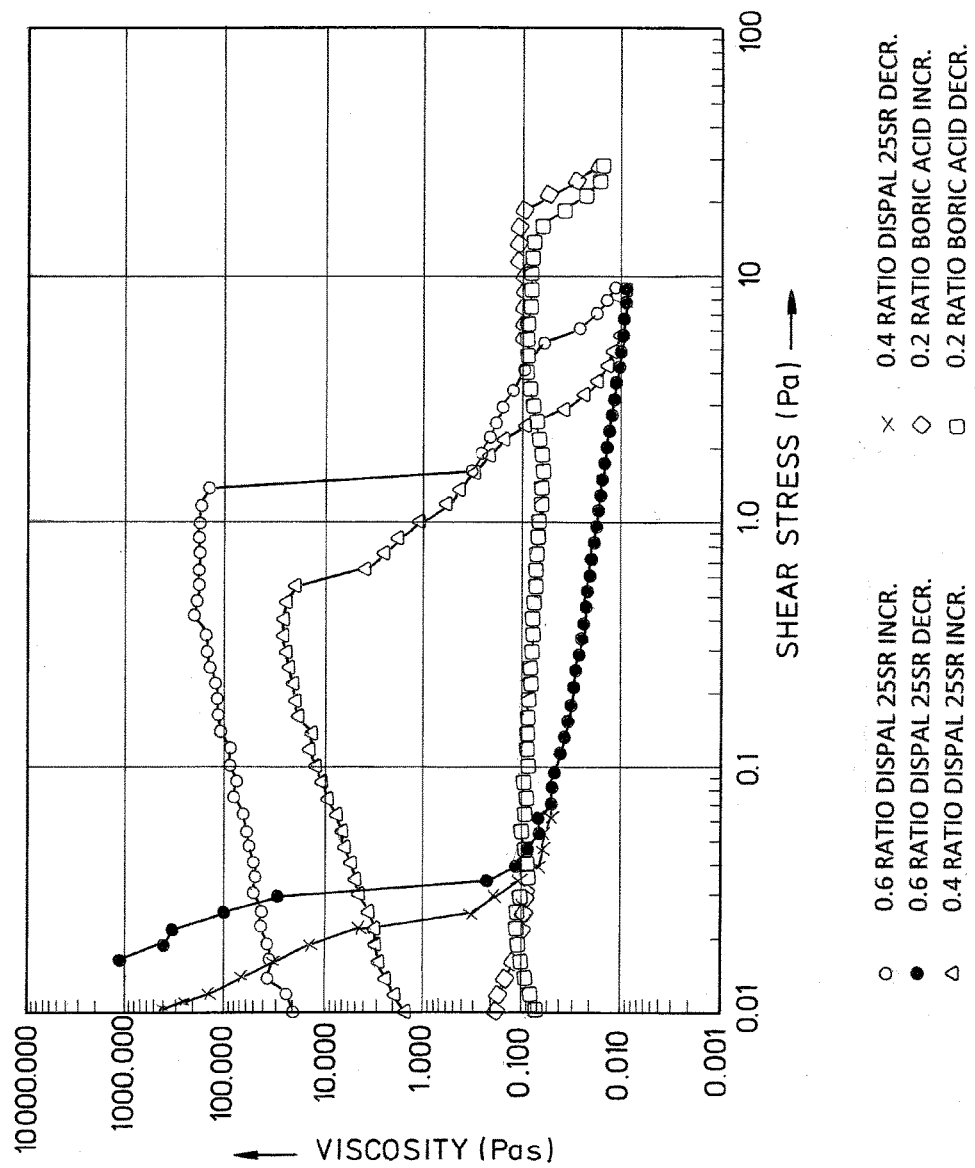
FIG. 2 is a graph similar to FIG. 1 showing the relationship between shear stress and viscosity for various guars gelled with alumina and boric acid.

The fracking fluids used in the industry which employ guar gum gels generally contain levels of 0.2 wt % guar. Data on the cross-linked guars at this level are shown in FIG. 2. As can be seen from FIG. 2, when using boric acid as the cross-linking agent, the best viscosity that can be achieved is about 100 centipoise (0.100 Pas) using a boric acid to guar ratio of 0.2 to 1. On the other hand, and as shown in FIG. 2, using DISPAL 25SR alumina, the viscosity of the cross-linked guar can be adjusted to significantly higher levels, or similar levels depending on the amount of alumina used.

It has also been found that by using DISPAL 25SR alumina to cross-link the gel results in a flow curve that has a very high resting viscosity or a viscosity at low shear stress, indicated by the curves marked "Incr" for increase in shear stress. After the yield point, the viscosity is low and upon decreasing the stress, marked "Decr," the viscosity recovers. The flow curves show low viscosity upon reduction of the stress until very low stresses, when it recovers the higher, resting viscosity. This can be advantageous as the viscosity remains low after yielding so that flow is not impeded by high viscosity. Further oscillatory measurements are shown in FIG. 5. In FIG. 5 it can be seen that altering the amount of DISPAL 25SR alumina changes the viscoelastic character of the cross-linked gel in a predictable manner.

A wide variation of properties can be obtained compared to a boric acid cross-linking. The trend lines of the graph shown in FIG. 5 show that the elasticity (G') and viscosity (G") can be adjusted over several orders of magnitude simply by changing the amount of alumina added to the system. This is to be contrasted with boric acid where increasing the amount does not alter the viscoelastic nature of the gel.

Generally speaking, any organic polymeric material which has free hydroxyl groups can be employed to produce the gels of the present invention. Non-limiting examples of such organic polymeric materials include polysaccharides, derivatives of cellulose ethers such as hydroxyalkyl cellulose, carboxyalkyl cellulose, carboxyalkyl hydroxyalkyl cellulose, polyvinyl alcohols, polyacrylic acids, polymethacrylic acids, xantham gums, locust bean gums, agar agar, cellulose gums, pectin, etc.

In one method, the alumina and guar could be pumped into the formulation as an aqueous dispersion which included a time-release activator to initiate the cross-links. Also, in applying the present invention to a fracking fluid, an aqueous dispersion of the guar gum would be pumped downhole to the formation to be fraced, following which the alumina dispersion could be pumped downhole to affect in situ cross-linking of the guar dispersion. Alternatively, the guar gum could be dispersed in a non-aqueous carrier, e.g., diesel or the like, this non-aqueous dispersion being added to water to hydrate the guar gum, following which it could be cross-linked either at the surface and pumped into the formation or in situ as described above. Using the latter method wherein the guar gum, prior to hydrating, is dispersed in a non-aqueous carrier facilitates handling, i.e., it eliminates having to transfer bags of guar gum powder to the well site. The use of a non-aqueous carrier which permits high loading of guar gum, also eliminates problems connected with growth of bacteria once the guar gum is hydrated. Effectively, by using these non-aqueous premixes, it is possible to transport larger volumes of guar gum to the site than could be affected if the guar gum was transported as a dry powder to the site or as an aqueous dispersion which again raises the problem of bacteria growth prior to use.

In using the boehmite aluminas of the present invention, one can employ boehmites that have been pretreated with acids, both inorganic and organic. In the latter regard, the alumina can be treated with p-toluene sulfonic acid which provides a cross-linking agent which cross-links with guar gum under basic pH, i.e. a PTSA alumina, which is acidic, can be added to the water dispersion of the guar gum and then the pH raised using a base thereby cross-linking the guar gum and forming the gel under substantially neutral or slightly basic conditions, a scenario which is desirable in certain instances. In particular, it is often preferred to maintain a generally neutral pH for a variety of reasons. Furthermore, the boehmite alumina which has not been pretreated with acid can be subjected to acid treatment for an extended period of time to impart the necessary properties, e.g., desired crystallite size, to make it an effective cross-linking agent.

While the invention has been discussed and described above with respect to the cross-linking of guar gum, it is not so limited.

A person of ordinary skill will recognize that in addition to the cross-linkable material in the alumina cross-linking agent, fracking and other well servicing fluids can include proppants, chemical additives, e.g., biocides, to tailor the fluid to the specific geological situation, and protect the well bore during the downhole operation.

With respect to Dispal 25SR alumina, it has been found that an aqueous guar gum dispersion which is highly elastic but not cross-linked if no base is added can be made. Such a composition may be useful in fluid loss control fluids. A further application of the cross-linked compositions of the present invention is their use in fire retardants. As is well known, fire retardant mixtures are delivered by air craft to control forest and brush fires and frequently contain cross-linked guar as a gellant to cause the retardant to adhere to foliage and enhance fire retardancy. The use of alumina as a cross-linking agent is greatly advantageous as it poses virtually no environmental problems and, as noted, since the gel can be more easily tailored than with the use of borate, would be more economical since less guar gum may be needed to produce suitable gels.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A thixotropic agent comprising:
a cross-linked gel of a polymeric organic material having free hydroxyl groups and a boehmite alumina having a crystallite size of less than 100 Å as measured on the 120 plane and which in an aqueous dispersion exhibits an Al-27 NMR peak at 80 ppm, wherein the alumina is selected from the groups
$Al(OH)_4^-$, $Al(OR)_4^-$, and mixtures thereof,
wherein R is an organic leaving group that can associate with the alumina in the sense that during the cross-linking reaction the organic group can disassociate from the alumina species which can then react with the hydroxyl groups on the polymeric organic material, and wherein the organic polymeric material is selected from the group consisting of polysaccharides, hydroxyalkyl cellulose, carboxyalkyl cellulose, carboxyalkyl hydroxyalkyl cellulose, polyvinyl alcohols, polyacrylic acids, polymethacrylic acids, locust bean gums, agar agar, xantham gums, cellulose gums, pectin, and mixtures thereof.

2. The thixotropic agent of claim 1, wherein the alumina comprises a boehmite alumina which is hydrothermally aged in the presence of paratoluene sulfonic acid.

3. The thixotropic agent of claim 1, wherein said polymeric organic material is guar gum.

4. The thixotropic agent of claim 1, wherein said polymeric organic material is a polysaccharide.

5. A fracking composition comprising an aqueous medium and the cross-linked gel according to claim 1.

6. The fracking composition of claim 5, further including a proppant.

7. A method of hydraulic fracturing a downhole formation comprising introducing into said formation the fracking fluid of claim 5 at a pressure exceeding that of the fracture gradient of the formation.

* * * * *